(12) United States Patent
Kim et al.

(10) Patent No.: US 11,580,899 B1
(45) Date of Patent: Feb. 14, 2023

(54) DISPLAY DEVICE

(71) Applicant: LG ELECTRONICS INC., Seoul (KR)

(72) Inventors: Kyuri Kim, Seoul (KR); Jongmin Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 17/721,149

(22) Filed: Apr. 14, 2022

(30) Foreign Application Priority Data

Jan. 3, 2022 (KR) .................. KR10-2022-0000143

(51) Int. Cl.
*G09G 3/32* (2016.01)

(52) U.S. Cl.
CPC ....... *G09G 3/32* (2013.01); *G09G 2310/0278* (2013.01); *G09G 2310/0286* (2013.01); *G09G 2310/08* (2013.01); *G09G 2320/0233* (2013.01); *G09G 2320/0686* (2013.01)

(58) Field of Classification Search
None
See application file for complete search history.

(56) References Cited

U.S. PATENT DOCUMENTS

| 2018/0270400 A1* | 9/2018 | Koh ........................ G06T 7/194 |
| 2018/0330695 A1 | 11/2018 | Baar et al. |
| 2019/0313072 A1 | 10/2019 | Kim |
| 2020/0193890 A1* | 6/2020 | Tichelaar ............. G09G 3/2003 |
| 2020/0286213 A1 | 9/2020 | Unger et al. |
| 2021/0035273 A1 | 2/2021 | Deng et al. |

FOREIGN PATENT DOCUMENTS

| KR | 10-2016-0064204 | 6/2016 |
| KR | 10-2020-0032584 | 3/2020 |

OTHER PUBLICATIONS

PCT International Application No. PCT/KR2022/005138, International Search Report dated Sep. 29, 2022, 3 pages.
Lee, et al., "Improvement of Efficient Tone-Mapping Curve using Adaptive Depth Range Coefficient", Journal of the Semiconductor & Display Technology, vol. 14, No. 4, Dec. 2015, 6 pages.
Korean Intellectual Property Office Application No. 10-2022-0000143, Office Action dated Nov. 11, 2022, 5 pages.

* cited by examiner

*Primary Examiner* — Christopher J Kohlman
(74) *Attorney, Agent, or Firm* — Lee, Hong, Degerman, Kang & Waimey PC

(57) ABSTRACT

Provided is a display device including a controller and a display. The controller may perform tone mapping for adjusting luminance of input image data, and the display may display an image according to an output image data, in which luminance is adjusted by the tone mapping. The controller may generate a base mapping curve from the input image data, analyze depth map information of the input image data, generate a mapping curve, to which the depth map information is reflected, from the base mapping curve, and perform the tone mapping using the mapping curve.

15 Claims, 19 Drawing Sheets

DISPLAY DEVICE

CROSS-REFERENCE TO RELATED APPLICATIONS

Pursuant to 35 U.S.C. § 119(a), this application claims the benefit of earlier filing date and right of priority to Korean Patent Application No. 10-2022-0000143, filed on Jan. 3, 2022, the contents of which are hereby incorporated by reference herein in its entirety.

BACKGROUND

The present disclosure relates to a display device and a driving method thereof. The present disclosure relates to a display device, in which an effect of dynamic tone mapping is enhanced, and a driving method thereof.

A digital image is generally composed of three channels of RGB, and in general, a standard dynamic range (SDR) image may express brightness in the range of 0-255 (8 bits) for each channel. However, in SDR images, the range of brightness that may be expressed in each channel is narrow, so dark parts are not properly expressed or bright parts are often not properly expressed. For example, in the case of an image in which a difference in brightness between a dark part and a bright part is significant, such as a photograph taken in backlight, the contrast balance is biased to one side. Accordingly, a large difference may occur between a scene viewed with the naked eye and an SDR image obtained by photographing the scene. In contrast to these SDR images, images expressed in 16 bits or 32 bits for each channel are called high dynamic range (HDR) images. The HDR images have the advantage of being able to be expressed more realistically since the HDR images may be expressed in a wider brightness.

However, since a general display device cannot express 16-bit or 32-bit gradation, a 16-bit or 32-bit HDR image needs to be converted into a digital image having a limited dynamic range. Tone mapping is used in the process of converting an HDR image into an SDR image or LDR (Low Dynamic Range) image and may refer to a technique of compressing a brightness of an HDR image to a brightness of an SDR image or an LDR image while improving a contrast ratio.

The display device may separate an object and a background from an image, improve visibility and a three-dimensional effect of an object by adjusting the luminance of the object area or the background area.

However, when simple luminance adjustment is performed on the object area, or simple luminance adjustment is performed on the background area, burial occurs in the low gradation area, or saturation occurs in the high gradation area depending on the surrounding environment or image genre. There is a limitation in that the visibility and three-dimensional effect of the object are deteriorated.

SUMMARY

The present disclosure provides a display device capable of improving visibility and a three-dimensional effect of a foreground, and a driving method thereof.

The present disclosure provides a display device capable of improving visibility and three-dimensional effect of an image by dynamically adjusting a dynamic tone mapping curve, a dynamic contrast curve, and a foreground brightness curve, and a driving method thereof.

The present disclosure provides a display device capable of performing tone mapping by utilizing depth map information of an image and improving visibility and three-dimensional effect of an image, and a driving method thereof.

A display device according to an embodiment may comprise a controller configured to perform tone mapping for adjusting luminance of input image data.

A display device according to an embodiment may comprise a display configured to output an image according to output image data, in which the luminance is adjusted by the tone mapping.

In one embodiment, a display device may comprise: a controller configured to perform tone mapping for adjusting luminance of input image data; and a display configured to output an image according to output image data, in which the luminance is adjusted by the tone mapping, wherein the controller may be configured to: generate a base mapping curve from the input image data; analyze depth map information of the input image data; generate a mapping curve, to which the depth map information is reflected, from the base mapping curve; and perform the tone mapping using the mapping curve.

The base mapping curve may comprise at least one of a base dynamic tone mapping curve, a base dynamic contrast curve, or a base foreground brightness curve about the input image data.

The mapping curve may comprise at least one of: a dynamic tone mapping curve generated by adjusting a gain from the base dynamic tone mapping curve based on the depth map information; a dynamic contrast curve generated by adjusting a gain from the base dynamic contrast curve based on the depth map information; or a foreground brightness curve generated by adjusting a gain from the base foreground brightness curve based on the depth map information.

The depth map information may comprise a depth map average picture level (APL) of the input image data.

When the depth map APL of the depth map information is greater than a reference value, the mapping curve may comprise: a first dynamic tone mapping curve, in which a gain decreases, from the base dynamic tone mapping curve; a first dynamic contrast curve, in which a gain decreases, from the base dynamic contrast curve; and a first foreground brightness curve, in which a gain increases, from the base foreground brightness curve.

When the depth map APL of the depth map information is greater than a reference value, the mapping curve may comprise a first dynamic tone mapping curve, in which a gain decreases, from the base dynamic tone mapping curve, and when the depth map APL of the depth map information is less than the reference value, the mapping curve may comprise a second dynamic tone mapping curve, in which a gain of the base dynamic tone mapping curve is maintained.

When the depth map APL of the depth map information is greater than a reference value, the mapping curve may comprise a first dynamic contrast curve, in which a gain decreases, from the base dynamic contrast curve, and when the depth map APL of the depth map information is less than the reference value, the mapping curve may comprise a second dynamic contrast curve, in which a gain of the base dynamic contrast curve is maintained.

When the depth map APL of the depth map information is greater than a reference value, the mapping curve may comprise a first foreground brightness curve, in which a gain decreases, from the base foreground brightness curve, and when the depth map APL of the depth map information is less than the reference value, the mapping curve may comprise a second foreground brightness curve, in which a gain of the base foreground brightness curve is maintained.

When the depth map APL of the depth map information is less than a reference value, the mapping curve may have the same gain as the base mapping curve.

The base mapping curve may be generated based on image information comprising histogram information and APL information of the input image data.

When the controller adjusts the gain of the base dynamic tone mapping curve, a first gain adjustment value in a first region, in which an output luminance value is greater than an input luminance value in the base dynamic tone mapping curve, and a second gain adjustment value in a second region, in which an output luminance value is less than an input luminance value in the base dynamic tone mapping curve, may be differently set.

When the controller adjusts the gain of the base dynamic contrast curve, a first gain adjustment value in a first region, in which an output luminance value is greater than an input luminance value in the base dynamic contrast curve, and a second gain adjustment value in a second region, in which an output luminance value is less than an input luminance value in the base dynamic contrast curve, may be differently set.

In another embodiment, a method for driving a display device may comprise: extracting image information from input image data to generate a base mapping curve; analyzing depth map information of the input image data; generating a mapping curve, to which the depth map information is reflected, from the base mapping curve; and performing tone mapping on the input image data by using the mapping curve to output an image according to output image data, in which luminance is adjusted.

The base mapping curve may comprise at least one of a base dynamic tone mapping curve, a base dynamic contrast curve, or a base foreground brightness curve about the input image data.

The mapping curve may comprise at least one of: a dynamic tone mapping curve generated by adjusting a gain from the base dynamic tone mapping curve based on the depth map information; a dynamic contrast curve generated by adjusting a gain from the base dynamic contrast curve based on the depth map information; or a foreground brightness curve generated by adjusting a gain from the base foreground brightness curve based on the depth map information.

The details of one or more embodiments are set forth in the accompanying drawings and the description below. Other features will be apparent from the description and drawings, and from the claims.

DETAILED DESCRIPTION OF THE EMBODIMENTS

Hereinafter, embodiments relating to the present disclosure will be described in detail with reference to the accompanying drawings. The suffixes "interface" for components used in the description below are assigned or mixed in consideration of easiness in writing the specification and do not have distinctive meanings or roles by themselves.

While ordinal numbers comprising 'first', 'second', etc. may be used to describe various components, they are not intended to limit the components. These expressions may be used to distinguish one component from another component.

Hereinafter, although a description will be given on the assumption that a display device is a smart TV supporting a broadcast reception function, the display device may comprise a smartphone, etc. That is, the display device according to an embodiment of the present disclosure does not necessarily comprise the components shown in FIG. 1.

Figure 1:
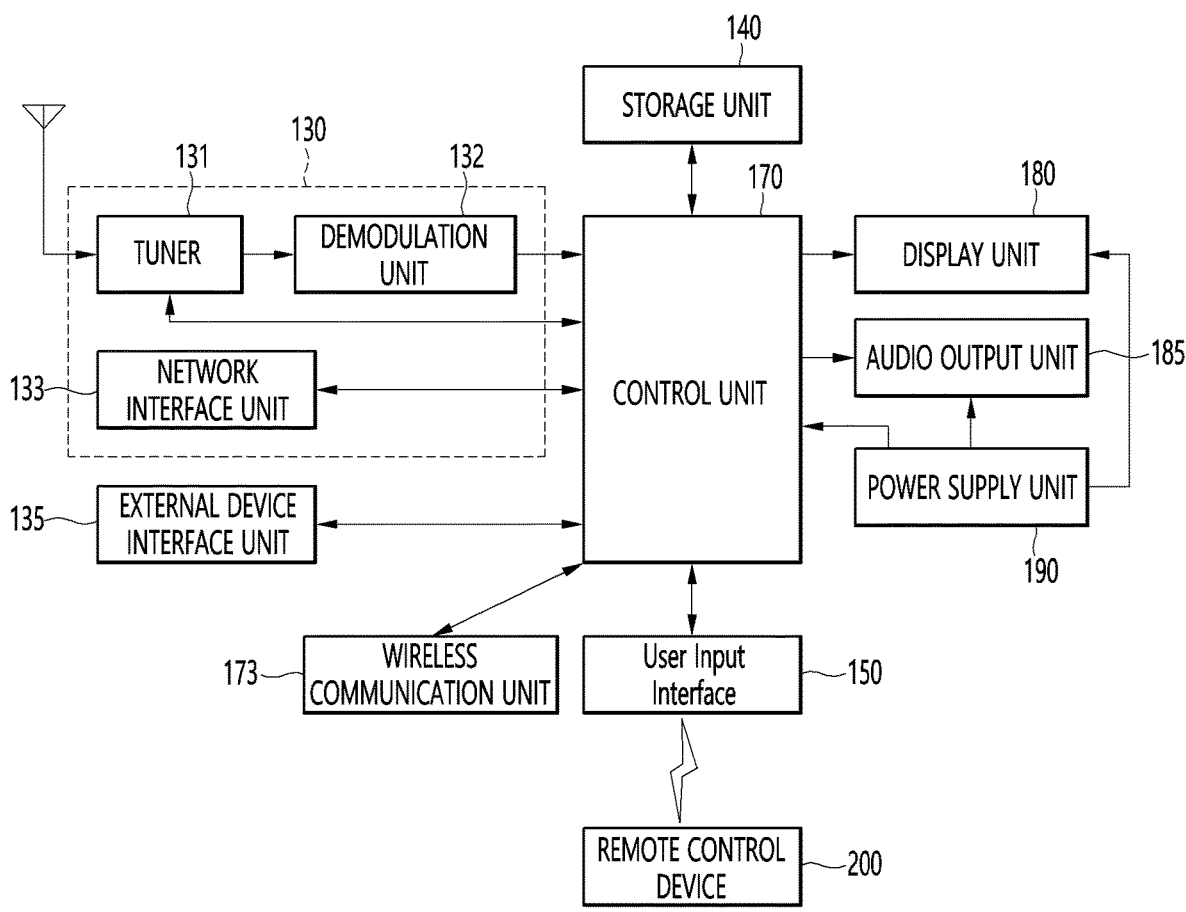
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 may comprise a broadcast reception module 130, an external device interface 135, a storage 140, a user input interface 150, a controller 170, a wireless communication interface 173, a display 180, an audio output interface 185, and a power supply 190.

The broadcast reception module 130 may comprise a tuner 131, a demodulator 132, and a network interface 133.

The tuner 131 may select a specific broadcast channel according to a channel selection command. The tuner 131 may receive broadcast signals for the selected specific broadcast channel.

The demodulator 132 may divide the received broadcast signals into video signals, audio signals, and broadcast program related data signals and restore the divided video signals, audio signals, and data signals to an output available form.

The network interface 133 may provide an interface for connecting the display device 100 to a wired/wireless network comprising internet network. The network interface 133 may transmit or receive data to or from another user or another electronic device through an accessed network or another network linked to the accessed network.

The network interface 133 may access a predetermined webpage through an accessed network or another network linked to the accessed network. That is, it may transmit or receive data to or from a corresponding server by accessing a predetermined webpage through network.

Then, the network interface 133 may receive contents or data provided from a content provider or a network operator. That is, the network interface 133 may receive contents such as movies, advertisements, games, VODs, and broadcast signals, which are provided from a content provider or a network provider, through network and information relating thereto.

Additionally, the network interface 133 may receive firmware update information and update files provided from a network operator and transmit data to an internet or content provider or a network operator.

The network interface 133 may select and receive a desired application among applications open to the air, through network.

The external device interface 135 may receive an application or an application list in an adjacent external device and deliver it to the controller 170 or the storage 140.

The external device interface 135 may provide a connection path between the display device 100 and an external device. The external device interface 135 may receive at least one of image and audio outputted from an external device that is wirelessly or wiredly connected to the display device 100 and deliver it to the controller. The external device interface 135 may comprise a plurality of external input terminals. The plurality of external input terminals may comprise an RGB terminal, at least one High Definition Multimedia Interface (HDMI) terminal, and a component terminal.

An image signal of an external device inputted through the external device interface 135 may be outputted through the display 180. A sound signal of an external device inputted through the external device interface 135 may be outputted through the audio output interface 185.

An external device connectable to the external device interface 135 may be one of a set-top box, a Blu-ray player, a DVD player, a game console, a sound bar, a smartphone, a PC, a USB Memory, and a home theater system but this is just exemplary.

Additionally, some content data stored in the display device 100 may be transmitted to a user or an electronic device, which is selected from other users or other electronic devices pre-registered in the display device 100.

The storage 140 may store signal-processed image, voice, or data signals stored by a program in order for each signal processing and control in the controller 170.

Additionally, the storage 140 may perform a function for temporarily store image, voice, or data signals outputted from the external device interface 135 or the network interface 133 and may store information on a predetermined image through a channel memory function.

The storage 140 may store an application or an application list inputted from the external device interface 135 or the network interface 133.

The display device 100 may play content files (for example, video files, still image files, music files, document files, application files, and so on) stored in the storage 140 and provide them to a user.

The user input interface 150 may deliver signals inputted from a user to the controller 170 or deliver signals from the controller 170 to a user. For example, the user input interface 150 may receive or process control signals such as power on/off, channel selection, and screen setting from the remote control device 200 or transmit control signals from the controller 170 to the remote control device 200 according to various communication methods such as Bluetooth, Ultra Wideband (WB), ZigBee, Radio Frequency (RF), and IR.

Additionally, the user input interface 150 may deliver, to the controller 170, control signals inputted from local keys (not shown) such as a power key, a channel key, a volume key, and a setting key.

Image signals that are image-processed in the controller 170 may be inputted to the display 180 and displayed as an image corresponding to corresponding image signals. Additionally, image signals that are image-processed in the controller 170 may be inputted to an external output device through the external device interface 135.

Voice signals processed in the controller 170 may be outputted to the audio output interface 185. Additionally, voice signals processed in the controller 170 may be inputted to an external output device through the external device interface 135.

Besides that, the controller 170 may control overall operations in the display device 100.

Additionally, the controller 170 may control the display device 100 by a user command or internal program inputted through the user input interface 150 and download a desired application or application list into the display device 100 in access to network.

The controller 170 may output channel information selected by a user together with processed image or voice signals through the display 180 or the audio output interface 185.

Additionally, according to an external device image playback command received through the user input interface 150, the controller 170 may output image signals or voice signals of an external device such as a camera or a camcorder, which are inputted through the external device interface 135, through the display 180 or the audio output interface 185.

Moreover, the controller 170 may control the display 180 to display images and control broadcast images inputted through the tuner 131, external input images inputted through the external device interface 135, images inputted through the network interface, or images stored in the storage 140 to be displayed on the display 180. In this case, an image displayed on the display 180 may be a still image or video and also may be a 2D image or a 3D image.

Additionally, the controller 170 may play content stored in the display device 100, received broadcast content, and external input content inputted from the outside, and the content may be in various formats such as broadcast images, external input images, audio files, still images, accessed web screens, and document files.

Moreover, the wireless communication interface 173 may perform a wired or wireless communication with an external electronic device. The wireless communication interface 173 may perform short-range communication with an external device. For this, the wireless communication interface 173 may support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication interface 173 may support wireless communication between the display device 100 and a wireless communication system, between the display device 100 and another display device 100, or between networks comprising the display device 100 and another display device 100 (or an external server) through wireless area networks. The wireless area networks may be wireless personal area networks.

Herein, the other display device 100 may be a mobile terminal such as a wearable device (for example, a smart watch, a smart glass, and a head mounted display (HMD)) or a smartphone, which is capable of exchanging data (or inter-working) with the display device 100. The wireless communication interface 173 may detect (or recognize) a communicable wearable device around the display device 100. Furthermore, if the detected wearable device is a device authenticated to communicate with the display device 100, the controller 170 may transmit at least part of data processed in the display device 100 to the wearable device through the wireless communication interface 173. Accordingly, a user of the wearable device may use the data processed in the display device 100 through the wearable device.

The display 180 may convert image signals, data signals, or OSD signals, which are processed in the controller 170, or images signals or data signals, which are received in the external device interface 135, into R, G, and B signals to generate driving signals.

Furthermore, the display device 100 shown in FIG. 1 is just one embodiment of the present disclosure and thus, some of the components shown may be integrated, added, or omitted according to the specification of the actually implemented display device 100.

That is, if necessary, two or more components may be integrated into one component or one component may be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 may receive images through the network interface 133 or the external device interface 135 and play them without comprising the tuner 131 and the demodulator 132.

For example, the display device 100 may be divided into an image processing device such as a set-top box for receiving broadcast signals or contents according to various network services and a content playback device for playing contents inputted from the image processing device.

In this case, an operating method of a display device according to an embodiment of the present disclosure described below may be performed by one of the display device described with reference to FIG. 1, an image processing device such as the separated set-top box, and a content playback device comprising the display 180 and the audio output interface 185.

Figure 2:
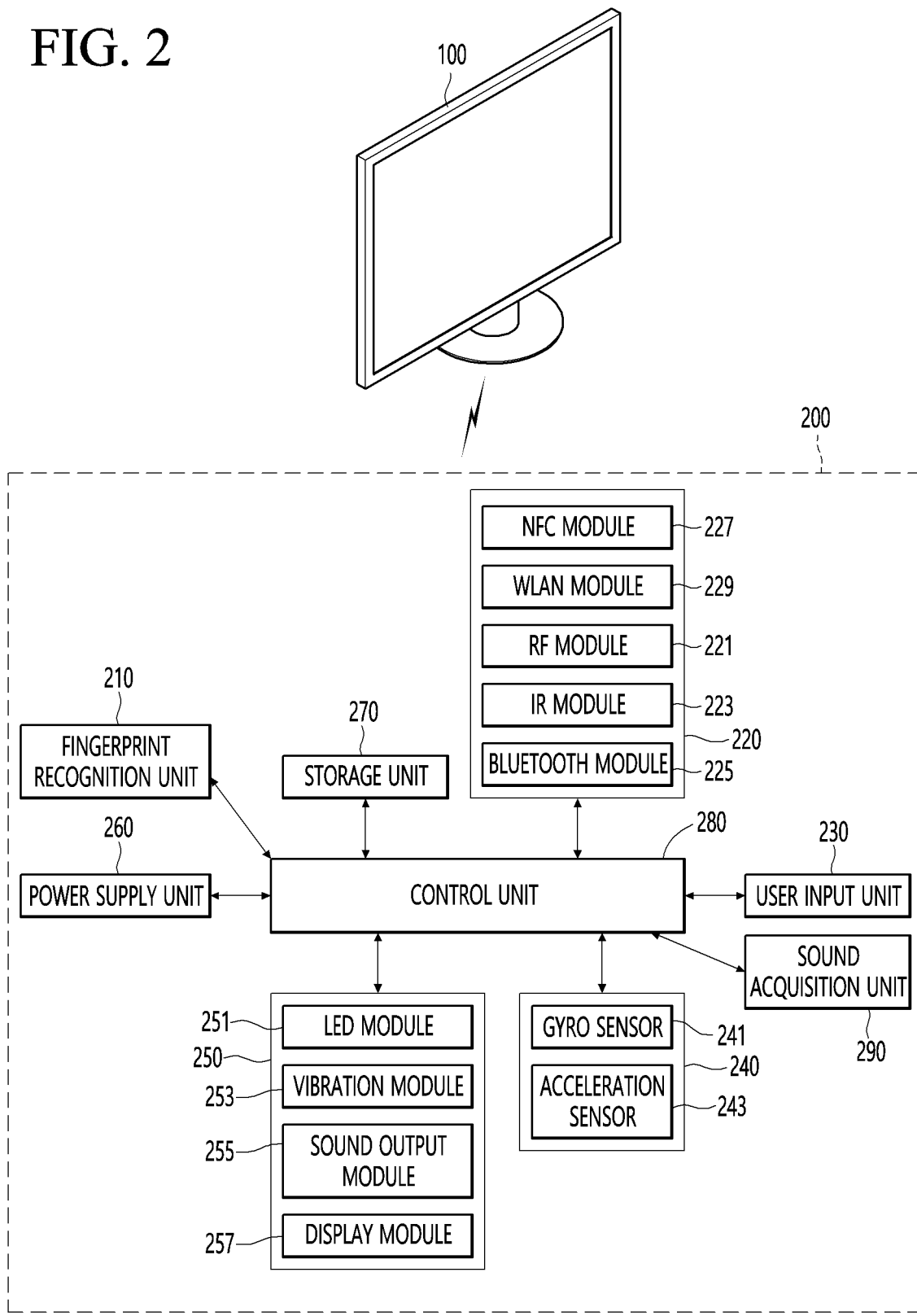
FIG. 2 is a block diagram illustrating a remote control device according to an embodiment of the present disclosure.
Figure 3:
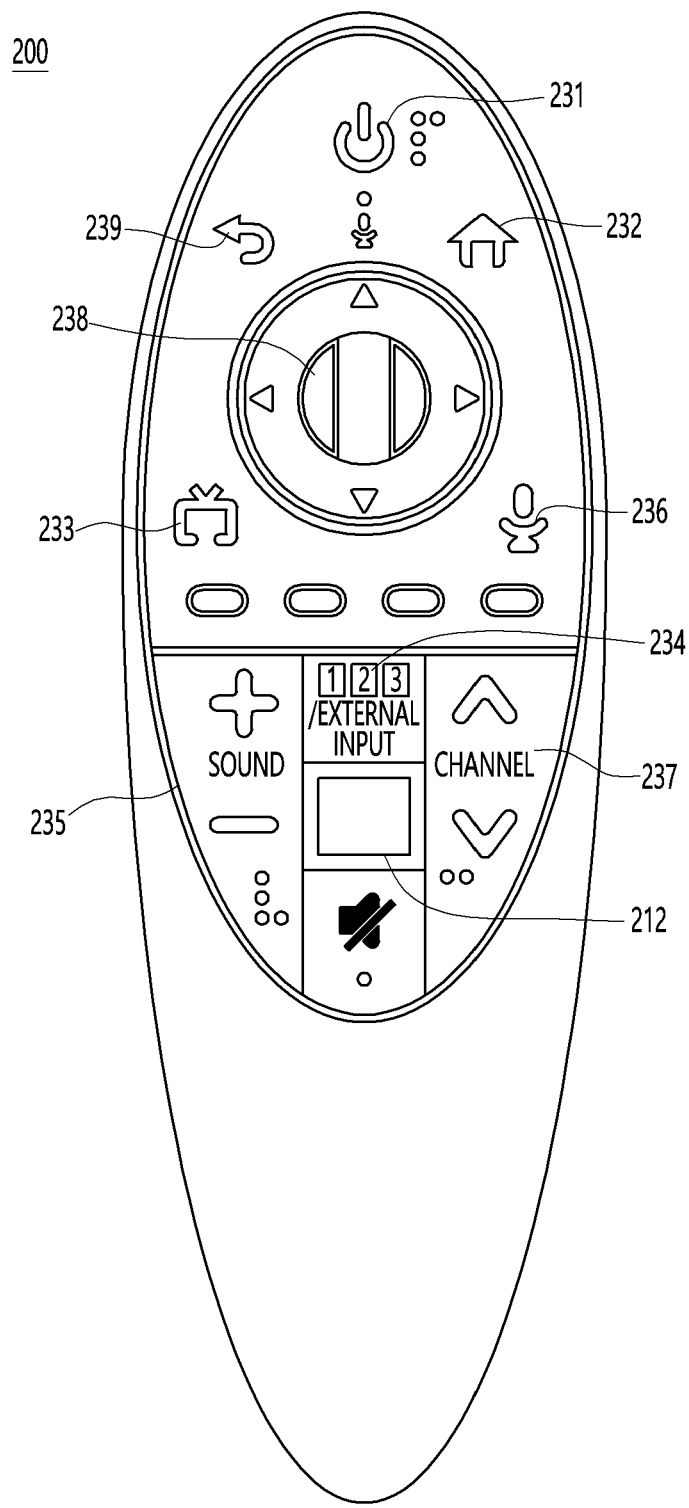
FIG. 3 is a view illustrating an actual configuration of a remote control device according to an embodiment of the present disclosure.

Then, referring to FIGS. 2 and 3, a remote control device is described according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 may comprise a fingerprint recognition module 210, a wireless communication interface 220, a user input interface 230, a sensor 240, an output interface 250, a power supply 260, a storage 270, a controller 280, and a voice acquisition module 290.

Referring to FIG. 2, the wireless communication interface 220 transmits/receives signals to/from an arbitrary any one of display devices according to the above-mentioned embodiments of the present disclosure.

The remote control device 200 may comprise an RF module 221 for transmitting/receiving signals to/from the display device 100 according to the RF communication standards and an IR module 223 for transmitting/receiving signals to/from the display device 100 according to the IR communication standards. Additionally, the remote control device 200 may comprise a Bluetooth module 225 for transmitting/receiving signals to/from the display device 100 according to the Bluetooth communication standards. Additionally, the remote control device 200 may comprise an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards.

Additionally, the remote control device 200 may transmit signals containing information on a movement of the remote control device 200 to the display device 100 through the wireless communication interface 220.

Moreover, the remote control device 200 may receive signals transmitted from the display device 100 through the RF module 221 and if necessary, may transmit a command on power on/off, channel change, and volume change to the display device 100 through the IR module 223.

The user input interface 230 may be configured with a keypad button, a touch pad, or a touch screen. A user may manipulate the user input interface 230 to input a command relating to the display device 100 to the remote control device 200. If the user input interface 230 comprises a hard key button, a user may input a command relating to the display device 100 to the remote control device 200 through the push operation of the hard key button. This will be described with reference to FIG. 3.

Referring to FIG. 3, the remote control device 200 may comprise a plurality of buttons. The plurality of buttons may comprise a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 may be a button for recognizing a user's fingerprint. According to an embodiment of the present disclosure, the fingerprint recognition button 212 may perform a push operation and receive a push operation and a fingerprint recognition operation. The power button 231 may be button for turning on/off the power of the display device 100. The power button 231 may be button for moving to the home screen of the display device 100. The live button 233 may be a button for displaying live broadcast programs. The external input button 234 may be button for receiving an external input connected to the display device 100. The voice adjustment button 235 may be button for adjusting the size of a volume outputted from the display device 100. The voice recognition button 236 may be a button for receiving user's voice and recognizing the received voice. The channel change button 237 may be a button for receiving broadcast signals of a specific broadcast channel. The check button 238 may be a button for selecting a specific function and the back button 239 may be a button for returning to a previous screen.

Again, FIG. 2 is described.

If the user input interface 230 comprises a touch screen, a user may touch a soft key of the touch screen to input a command relating to the display device 100 to the remote control device 200. Additionally, the user input interface 230 may comprise various kinds of input means manipulated by a user, for example, a scroll key and a jog key, and this embodiment does not limit the scope of the present disclosure.

The sensor 240 may comprise a gyro sensor 241 or an acceleration sensor 243 and the gyro sensor 241 may sense information on a movement of the remote control device 200.

For example, the gyro sensor 241 may sense information on an operation of the remote control device 200 on the basis of x, y, and z axes and the acceleration sensor 243 may sense information on a movement speed of the remote control device 200. Moreover, the remote control device 200 may further comprise a distance measurement sensor and sense a distance with respect to the display 180 of the display device 100.

The output interface 250 may output image or voice signals corresponding to a manipulation of the user input interface 230 or corresponding to signals transmitted from the display device 100. A user may recognize whether the user input interface 230 is manipulated or the display device 100 is controlled through the output interface 250.

For example, the output interface 250 may comprise an LED module 251 for flashing, a vibration module 253 for generating vibration, a sound output module 255 for outputting sound, or a display module 257 for outputting an image, if the user input interface 230 is manipulated or signals are transmitted/received to/from the display device 100 through the wireless communication interface 220.

Additionally, the power supply 260 supplies power to the remote control device 200 and if the remote control device 200 does not move for a predetermined time, stops the power supply, so that power waste may be reduced. The power supply 260 may resume the power supply if a predetermined key provided at the remote control device 200 is manipulated.

The storage 270 may store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The controller 280 of the remote control device 200 may store, in the storage 270, information on a frequency band for transmitting/receiving signals to/from the display device 100 paired with the remote control device 200 and refer to it.

The controller 280 controls general matters relating to a control of the remote control device 200. The controller 280 may transmit a signal corresponding to a predetermined key manipulation of the user input interface 230 or a signal corresponding to a movement of the remote control device 200 sensed by the sensor 240 to the display device 100 through the wireless communication interface 220.

Additionally, the voice acquisition module 290 of the remote control device 200 may obtain voice.

The voice acquisition module 290 may comprise at least one microphone 291 and obtain voice through the microphone 291.

Figure 4:
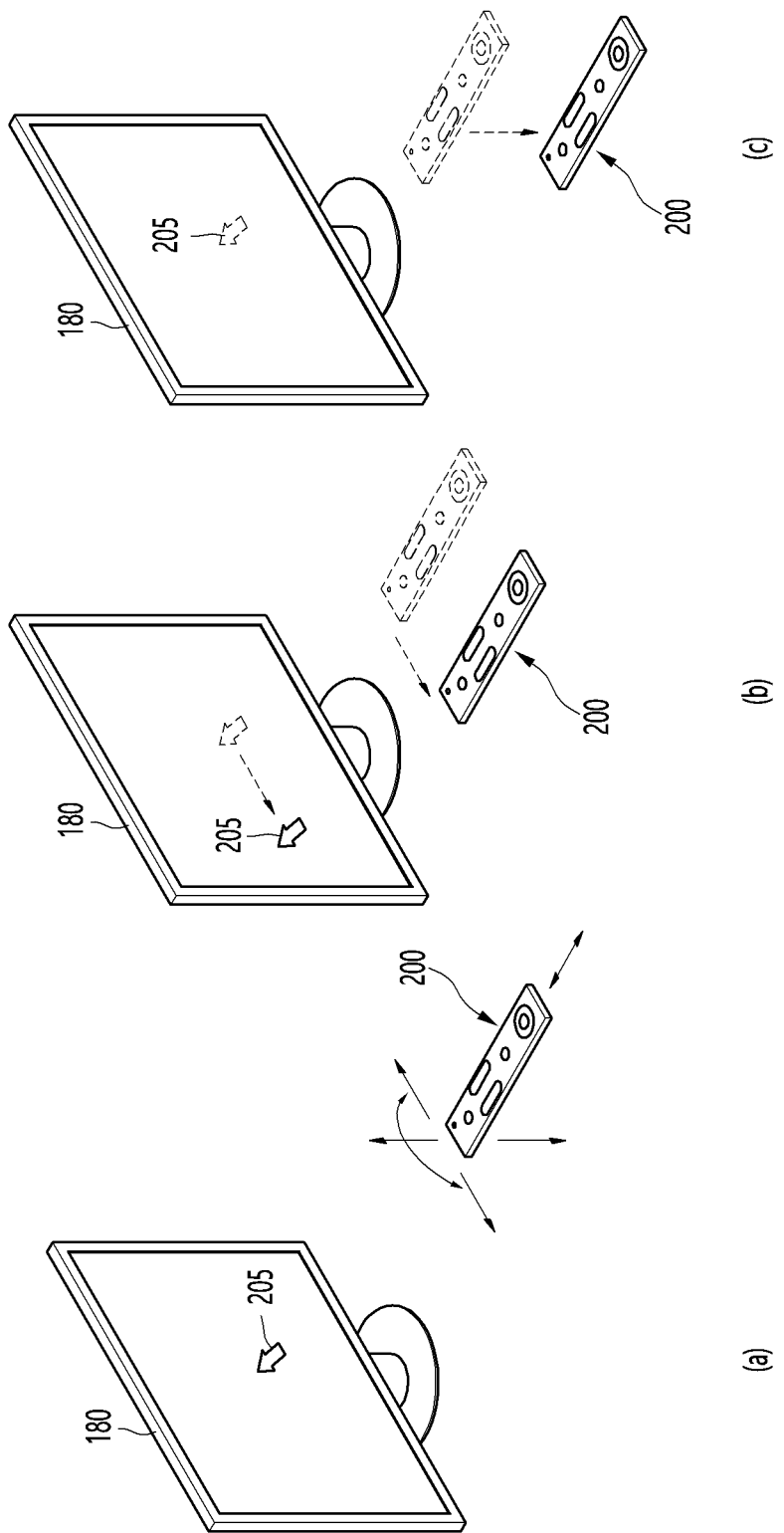
FIG. 4 is a view of utilizing a remote control device according to an embodiment of the present disclosure.

Then, FIG. 4 is described.

FIG. 4 is a view of utilizing a remote control device according to an embodiment of the present disclosure.

FIG. 4A illustrates that a pointer 205 corresponding to the remote control device 200 is displayed on the display 180.

A user may move or rotate the remote control device 200 vertically or horizontally. The pointer 205 displayed on the display 180 of the display device 100 corresponds to a movement of the remote control device 200. Since the corresponding pointer 205 is moved and displayed according to a movement on a 3D space as show in the drawing, the remote control device 200 may be referred to as a spatial remote controller.

FIG. 4B illustrates that if a user moves the remote control device 200, the pointer 205 displayed on the display 180 of the display device 100 is moved to the left in correspondence thereto.

Information on a movement of the remote control device 200 detected through a sensor of the remote control device 200 is transmitted to the display device 100. The display device 100 may calculate the coordinates of the pointer 205 from the information on the movement of the remote control device 200. The display device 100 may display the pointer 205 to match the calculated coordinates.

FIG. 4C illustrates that while a specific button in the remote control device 200 is pressed, a user moves the remote control device 200 away from the display 180. Thus, a selection area in the display 180 corresponding to the pointer 205 may be zoomed in and displayed largely.

On the other hand, if a user moves the remote control device 200 close to the display 180, a selection area in the display 180 corresponding to the pointer 205 may be zoomed out and displayed reduced.

On the other hand, if the remote control device 200 is away from the display 180, a selection area may be zoomed out and if the remote control device 200 is close to the display 180, a selection area may be zoomed in.

Additionally, if a specific button in the remote control device 200 is pressed, the recognition of a vertical or horizontal movement may be excluded. That is, if the remote control device 200 is moved away from or close to the display 180, the up, down, left, or right movement may not be recognized and only the back and forth movement may be recognized. While a specific button in the remote control device 200 is not pressed, only the pointer 205 is moved according to the up, down, left or right movement of the remote control device 200.

Moreover, the moving speed or moving direction of the pointer 205 may correspond to the moving speed or moving direction of the remote control device 200.

Furthermore, a pointer in this specification means an object displayed on the display 180 in correspondence to an operation of the remote control device 200. Accordingly, besides an arrow form displayed as the pointer 205 in the drawing, various forms of objects are possible. For example, the above concept comprises a point, a cursor, a prompt, and a thick outline. Then, the pointer 205 may be displayed in correspondence to one point of a horizontal axis and a vertical axis on the display 180 and also may be displayed in correspondence to a plurality of points such as a line and a surface.

The display device 100 according to an embodiment may comprise a controller 170 that performs tone mapping for adjusting the luminance of input image data.

The display device 100 may comprise the display 180 that displays an image according to output image data in which luminance is adjusted by the tone mapping performed by the controller 170.

Hereinafter, a process of performing tone mapping in the display device according to an embodiment will be further described with reference to FIG. 5.

Figure 5:
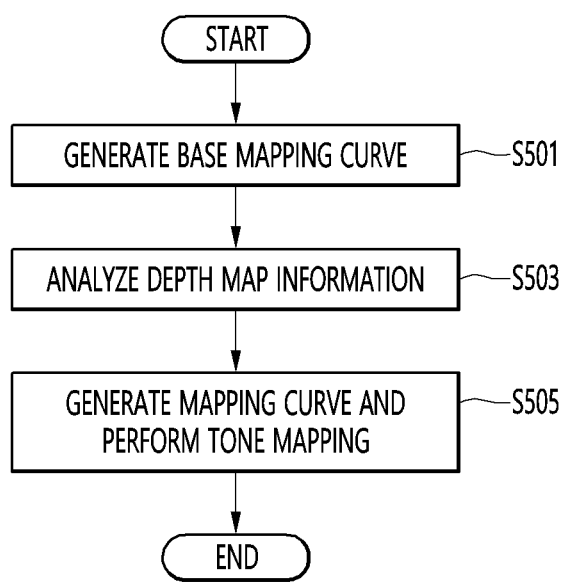
FIG. 5 is a flowchart for explaining a method for driving a display device according to an embodiment of the present disclosure.

FIG. 5 is a flowchart for explaining a method for driving a display device according to an embodiment of the present disclosure.

A controller 170 may generate a base mapping curve (S501).

According to the method for driving the display device 100 according to an embodiment, the controller 170 may generate the base mapping curve from input image data.

For example, the base mapping curve may be generated through processing of a high dynamic range (HDR) on input image data.

The base mapping curve generated by the controller 170 may comprise a dynamic tone mapping (DTM) curve. The base mapping curve may comprise a base dynamic contrast (DC) curve. The base mapping curve may comprise a base foreground brightness curve.

The base mapping curve may comprise at least one of the base dynamic tone mapping curve about the input image data, the base dynamic contrast curve about the input image data, or the base foreground brightness curve about the input image data.

When receiving the image data, the controller 170 may receive metadata together. The input image data may be an HDR image. The metadata may comprise information about the input image data. The metadata may comprise at least one of luminance information of the HDR image, maximum brightness information for each scene, and information for identifying the HDR image.

Also, the controller 170 may calculate a luminance distribution histogram from the input image data. The luminance distribution histogram of the HDR image may mean distribution information of brightness values of pixels of the HDR image. The controller 170 may calculate the luminance distribution histogram that is a distribution for signal levels (e.g., 0 to 1023) of the pixels of the HDR image.

The base mapping curve may be generated based on image information comprising histogram information and APL information of the input image data.

The controller 170 may generate the base dynamic tone mapping (DTM) curve based on information on the luminance distribution histogram for the input image data. The base DTM curve may mean a mapping curve in an RGB domain. In the RGB domain, mapping from input image data to the output image data may be performed according to the generated base DTM curve.

The controller 170 may generate the base dynamic contrast (DC) curve. The base DC curve may mean a mapping curve in a luminance (Y) domain. In the luminance (Y) domain, mapping from input image data to output image data may be performed according to the generated base DC curve.

The controller 170 may generate the base foreground brightness curve. The controller 170 may extract a foreground from the input image data. As another expression, the controller 170 may extract an object and a background from the input image data. The controller 170 may adjust luminance of pixels corresponding to the object or adjust the luminance of pixels corresponding to the background. The base foreground brightness curve may be a curve for adjusting the luminance of the pixels corresponding to the object or the background. The visibility and three-dimensional effect of the object corresponding to the foreground may be improved by the tone mapping to which the base foreground brightness curve is applied.

The controller 170 may improve the luminance of the pixels corresponding to the object or reduce the luminance of the pixels corresponding to the background to improve the visibility and three-dimensional effect of the object corresponding to the foreground.

In order to generate the output image data that is suitable for characteristics of the display 180 with respect to the input image data, a method for generating the base DTM curve, the base DC curve, and the base foreground brightness curve through the controller 170 is known, and thus, a detailed description thereof will be omitted herein.

Next, the controller 170 may analyze depth map information (S503).

According to the method for driving the display device 100 according to an embodiment, the controller 170 may extract depth map information of the input image data. The depth map information may comprise a depth map average picture level (APL) of the input image data.

For example, in the depth map, an object or area that is relatively close to a surface of the image may be displayed with relatively bright pixels, and an object or area that is relatively far from the surface of the image may be displayed with relatively dark pixels. According to an embodiment, the depth map may be extracted from the input image data through artificial intelligence-based image processing using machine learning technologies.

Next, the controller 170 may generate a mapping curve and perform tone mapping (S505).

The controller 170 may generate the mapping curve in which the depth map information is reflected from the base mapping curve and perform the tone mapping using the mapping curve.

The mapping curve may comprise a dynamic tone mapping curve generated by adjusting a gain from the base dynamic tone mapping curve based on the depth map information. The dynamic tone mapping curve may be a curve in which luminance is adjusted by reflecting the depth map information with respect to the base dynamic tone mapping curve.

The mapping curve may comprise a dynamic contrast curve generated by adjusting a gain from the base dynamic contrast curve based on the depth map information. The dynamic contrast curve may be a curve in which luminance is adjusted by reflecting the depth map information with respect to the base dynamic contrast curve. The dynamic contrast curve may be a curve in which contrast is adjusted by reflecting the depth map information with respect to the base dynamic contrast curve.

The mapping curve may comprise a foreground brightness curve generated by adjusting a gain from the base foreground brightness curve based on the depth map information. The foreground brightness curve may be a curve in which luminance is adjusted by reflecting the depth map information with respect to the base foreground brightness curve.

The mapping curve may comprise at least one of the dynamic tone mapping curve generated by adjusting the gain from the base dynamic tone mapping curve based on the depth map information, the dynamic contrast curve generated by adjusting the gain from the base dynamic contrast curve based on the depth map information, or the foreground brightness curve generated by adjusting the gain from the base foreground brightness curve based on the depth map information.

The depth map according to an embodiment will be described with reference to FIGS. 6 and 7.

Figure 6:
FIG. 6 is a view illustrating an example of an image depending on input image data in the display device according to an embodiment of the present disclosure.
Figure 7:
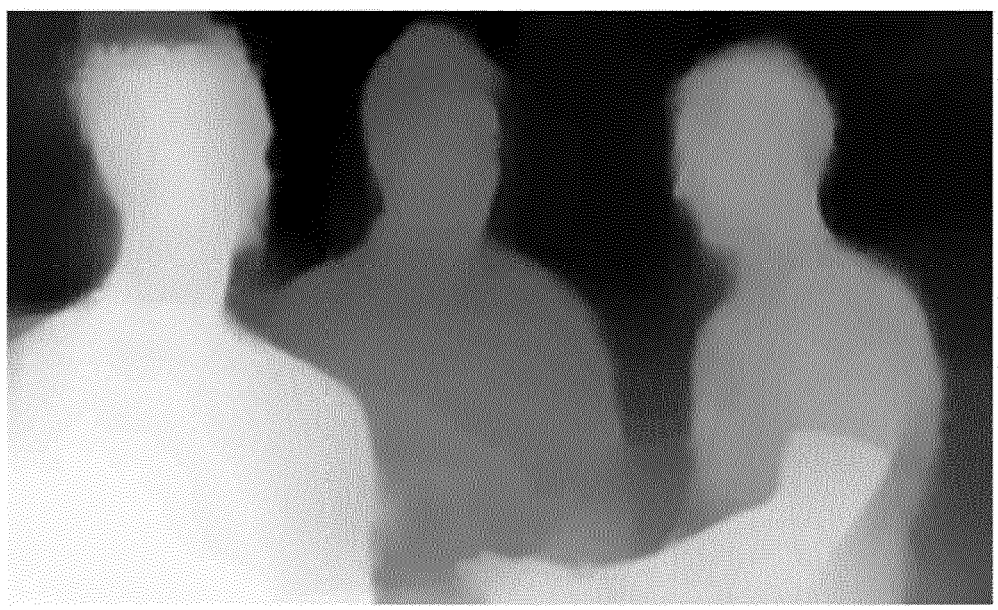
FIG. 7 is a view for explaining a depth map of the image illustrated in FIG. 6.

FIG. 6 is a view illustrating an example of an image depending on the input image data in the display device according to an embodiment of the present disclosure, and FIG. 7 is a view for explaining a depth map of the image illustrated in FIG. 6.

For example, three objects may be displayed on the image illustrated in FIG. 6, and it is seen that the three objects have different senses of distance from a surface of the image. The first object disposed at the leftmost side is disposed closest to the surface of the image, and the second object disposed in the middle is disposed farthest from the surface of the image. Also, the third object disposed on the rightmost side is disposed relatively in the middle from the surface of the image.

It is seen that the luminance of each object is displayed differently in the depth map of the image illustrated in FIG. 7. FIG. 7 illustrates a depth map of the image illustrated in FIG. 6, and the depth map comprises depth map APL information according to a depth of each object.

For example, three objects are displayed on the image illustrated in FIG. 7. Luminance of a first object disposed at the leftmost side is relatively brightest, and luminance of a second object disposed in the middle is relatively darkest. Luminance of a third object disposed on the rightmost side is displayed as a relatively medium luminance. Also, it is seen that the background in which the three objects are not disposed has darker luminance compared to the second object. According to an embodiment, it is seen that the background is disposed at a farther distance compared to the three objects.

According to an embodiment, the controller 170 may obtain depth map APL information from the depth map. The controller 170 may obtain an area size and luminance information of each object from the depth map.

According to an embodiment, the controller 170 may compare the depth map APL with a reference value and determine whether a gain of the base mapping curve is adjusted. The reference value of the depth map APL may be adaptively selected according to a usage environment of the display device 100. The reference value of the depth map APL may be adaptively selected according to ambient brightness of the display device 100. The reference value of the depth map APL may be adaptively selected according to a genre of an image displayed on the display device 100.

For example, as in the images illustrated in FIGS. 6 and 7, when the depth map APL has a relatively large value, the controller 170 may generate a mapping curve having an adjusted gain from the base mapping curve. It will be described that the depth map APL of the image illustrated in FIG. 7 is 160 (8-bit standard), and this value corresponds to a case in which the value is greater than the reference value of the depth map APL.

Figure 8:
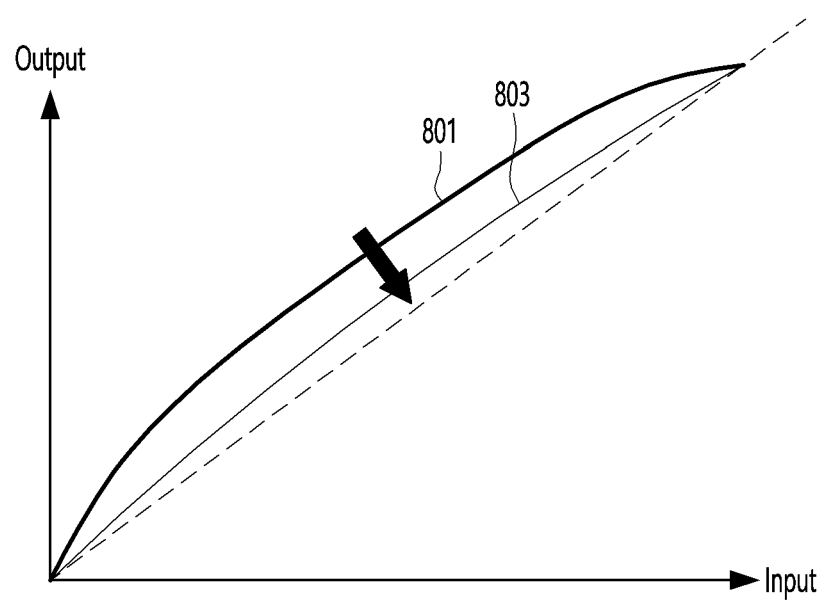
FIG. 8 is a view for explaining adjustment of a dynamic tone mapping curve in the display device according to an embodiment of the present disclosure.
Figure 9:
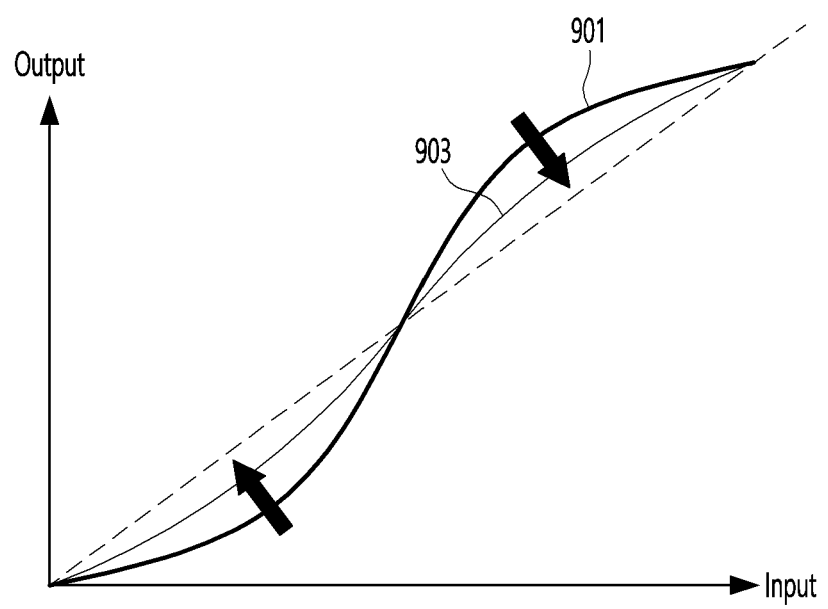
FIG. 9 is a view for explaining adjustment of a dynamic contrast curve in the display device according to an embodiment of the present disclosure.
Figure 10:
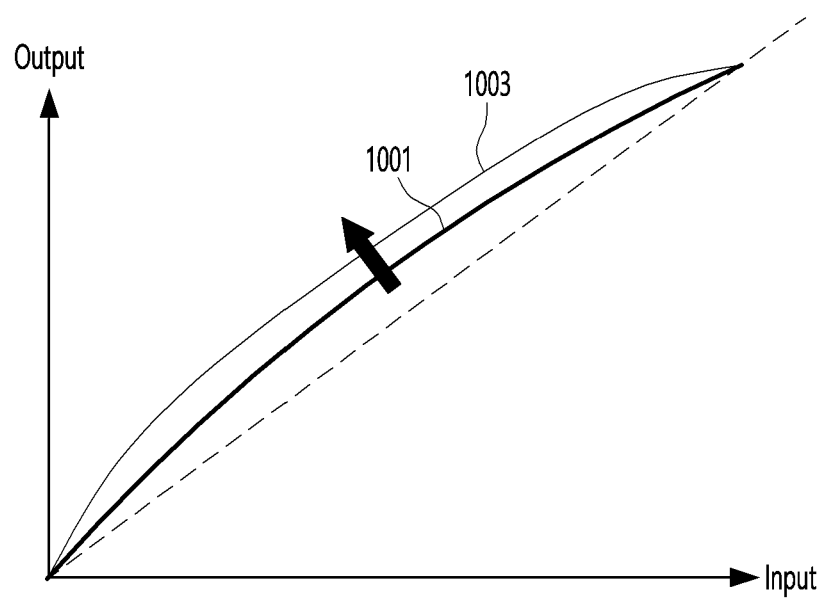
FIG. 10 is a view for explaining adjustment of a foreground brightness curve in the display device according to an embodiment of the present disclosure.

FIG. 8 is a view for explaining adjustment of the dynamic tone mapping curve in the display device according to an embodiment of the present disclosure, FIG. 9 is a view for explaining adjustment of the dynamic contrast curve in the display device according to an embodiment of the present disclosure, and FIG. 10 is a view for explaining adjustment of the foreground brightness curve in the display device according to an embodiment of the present disclosure.

When the depth map APL of the image is greater than the reference value, the controller 170 may generate a dynamic tone mapping curve 803 having a reduced gain from a base dynamic tone mapping curve 801 as illustrated in FIG. 8.

When the depth map APL of the image is greater than the reference value, the controller 170 may generate a dynamic contrast mapping curve 903 having a reduced gain from a base dynamic contrast mapping curve 901 as illustrated in FIG. 9.

When the depth map APL of the image is greater than the reference value, the controller 170 may generate a foreground brightness curve 1003 having an increased gain from a base foreground brightness curve 1001 as illustrated in FIG. 10.

As described above, the controller 170 may generate a mapping curve through gain adjustment from the base mapping curve based on the depth map information of the input image data. When the depth map APL is greater than the reference value, the controller 170 may generate the mapping curve in which the gain decreases from the base dynamic tone mapping curve 801, the gain decreases from the base dynamic contrast curve 901, and the gain increases from the base foreground brightness curve 1001.

The controller 170 may allow brightness setting of the entire area to reduce through the gain adjustment and allow brightness setting of the foreground area to increase through the gain adjustment, thereby improving the visibility and the three-dimensional effect on the foreground area.

Figure 11:
FIG. 11 is a view illustrating an example of an image depending on input image data in the display device according to an embodiment of the present disclosure.
Figure 12:
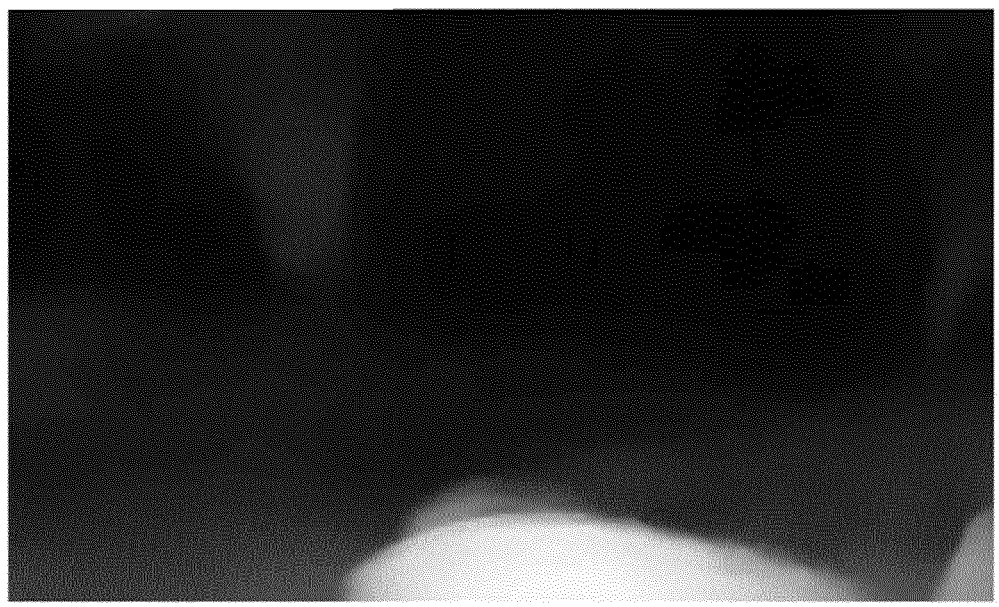
FIG. 12 is a view for explaining a depth map of the image illustrated in FIG. 11.

FIG. 11 is a view illustrating an example of the image depending on the input image data in the display device according to an embodiment of the present disclosure, and FIG. 12 is a view for explaining the depth map of the image illustrated in FIG. 11.

As in the images illustrated in FIGS. 11 and 12, when the depth map APL has a relatively small value, the controller 170 may determine whether the gain is adjusted from the base mapping curve and adaptively generate the mapping curve. It will be described that the depth map APL of the image illustrated in FIG. 14 is 40 (8-bit standard), and this value corresponds to a case in which the value is less than the reference value of the depth map APL.

Figure 13:
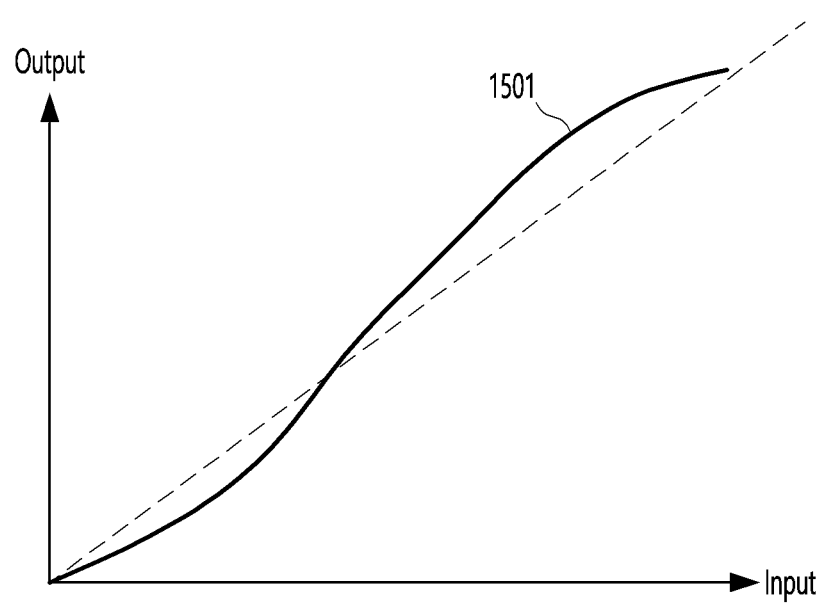
FIG. 13 is a view for explaining adjustment of a dynamic tone mapping curve in the display device according to an embodiment of the present disclosure.
Figure 14:
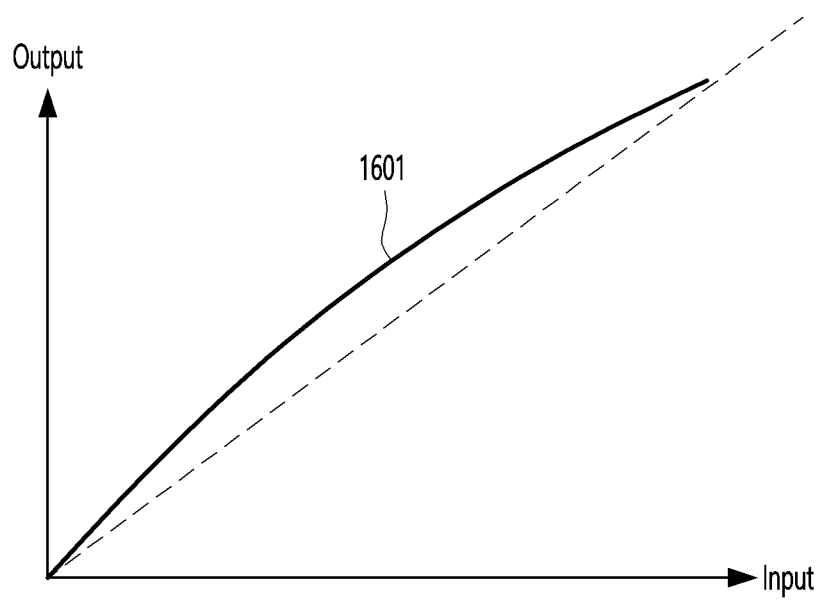
FIG. 14 is a view for explaining adjustment of a dynamic contrast curve in the display device according to an embodiment of the present disclosure.
Figure 15:
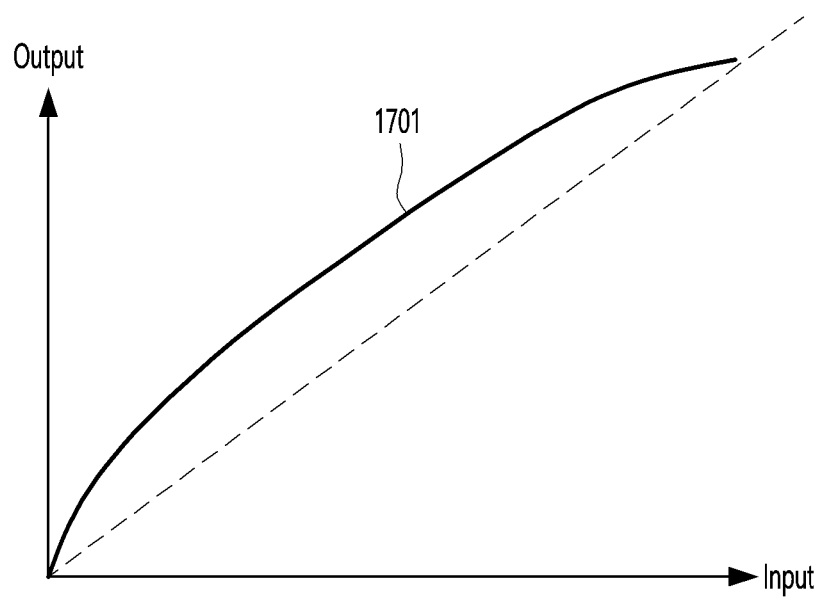
FIG. 15 is a view for explaining adjustment of a foreground brightness curve in the display device according to an embodiment of the present disclosure.

FIG. 13 is a view for explaining adjustment of the dynamic tone mapping curve in the display device according to an embodiment of the present disclosure, FIG. 14 is a view for explaining adjustment of the dynamic contrast curve in the display device according to an embodiment of the present disclosure, and FIG. 15 is a view for explaining adjustment of the foreground brightness curve in the display device according to an embodiment of the present disclosure.

For example, when the depth map APL is less than the reference value, the controller 170 may generate the dynamic tone mapping curve in which the gain of the base dynamic tone mapping curve 1501 is maintained as illustrated in FIG. 13.

When the depth map APL is less than the reference value, the controller 170 may generate the dynamic contrast curve in which the gain of the base dynamic contrast curve 1601 is maintained as illustrated in FIG. 14.

When the depth map APL is less than the reference value, the controller 170 may generate the foreground brightness curve in which the gain of the base foreground brightness curve 1701 is maintained as illustrated in FIG. 15.

As described above, the controller 170 may determine whether the gain of the base mapping curve is adjusted based on the depth map information of the input image data. When the depth map APL is less than the reference value, the controller 170 may generate the mapping curve in which the gain of the base dynamic tone mapping curve 1501 is maintained, the gain of the base dynamic contrast curve 1601 is maintained, and the gain of the base foreground brightness curve 1701 is maintained.

Thus, when the depth map APL is less than the reference value, the mapping curve may be generated as a curve having the same gain as the base mapping curve.

The controller 170 may determine whether the gain is adjusted based on the depth map information of the input image data and maintain the existing brightness setting of the entire area to prevent the brightness of the entire area from being deteriorated.

The controller 170 may perform tone mapping on the input image data by using an adaptive mapping curve to which the depth map information of the image is reflected.

An image according to the output image data on which the adaptive tone mapping is performed by the controller 170 may be displayed on the display 180.

As described above, according to the display device and the driving method thereof according to the embodiment of the present disclosure, the visibility and the three-dimensional effect of the foreground may be improved.

According to the display device and the driving method thereof according to the embodiment of the present disclosure, the visibility and three-dimensional effect of the image may be improved by dynamically adjusting the dynamic tone mapping curve, the dynamic contrast curve, and the foreground brightness curve.

According to the display device and the driving method thereof according to the embodiment of the present disclosure, the tone mapping may be performed by using the depth map information of the image to improve the visibility and the three-dimensional effect of the image.

In the display device 100 according to an embodiment, when the depth map information of the input image is changed, the dynamic tone mapping is performed according to the changed depth map information. For example, when the depth map APL of the input image is changed, shapes of the dynamic tone mapping curve, the dynamic tone contrast curve, and the foreground brightness curve may be changed according to the depth map APL value.

Thus, if the display device 100 tends to be changed in luminance and visibility of the foreground area depending on the dynamic tone mapping according to the change in the depth map APL value of the input image, it may be determined that the concept of the dynamic tone mapping of the display device 100 according to the present disclosure is applied.

In the display device 100 according to an embodiment, a gain adjustment degree and a gain adjustment method may be variously modified and implemented according to a driving environment or a displayed image genre.

Figure 16:
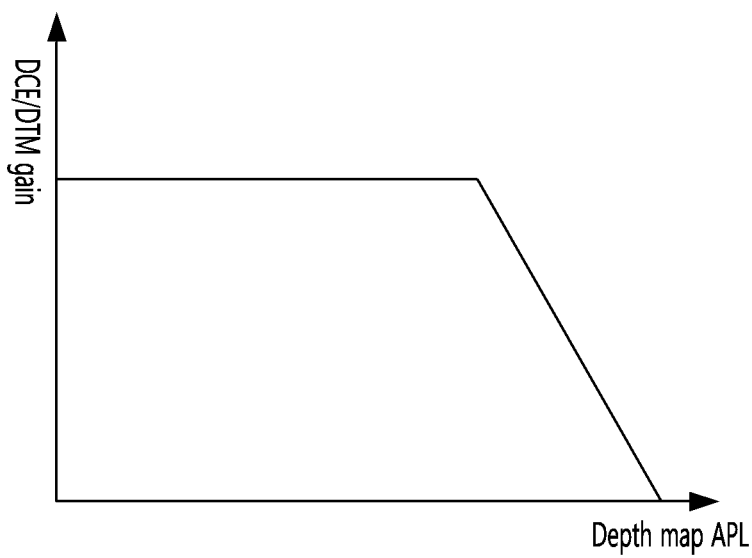
FIG. 16 is a view for explaining gain adjustment of the dynamic tone mapping curve and gain adjustment of the dynamic contrast curve depending on a depth map APL value in the display device according to an embodiment of the present disclosure.

FIG. 16 is a view for explaining gain adjustment of the dynamic tone mapping curve and gain adjustment of the dynamic contrast curve depending on the depth map APL value in the display device according to an embodiment of the present disclosure.

According to an embodiment, the controller 170 may determine whether the gain of the dynamic tone mapping curve is adjusted, or the gain of the dynamic contrast curve is adjusted according to the value of the depth map APL. FIG. 16 illustrates an example of the gain adjustment, in which the adjusted gain value is flexibly changed according to an image quality evaluation result and an improvement direction.

For example, when the depth map APL is greater than the reference value, the controller 170 may select to decrease in gain of the dynamic tone mapping curve according to an increase in depth map APL value.

When the depth map APL is less than the reference value, the controller 170 may select to maintain the gain of the dynamic tone mapping curve in response to the change in depth map APL value.

For example, when the depth map APL is greater than the reference value, the controller 170 may select to decrease in gain of the dynamic contrast mapping curve according to an increase in depth map APL value.

When the depth map APL is less than the reference value, the controller 170 may select to maintain the gain of the dynamic contrast curve in response to the change in depth map APL value.

Figure 17:
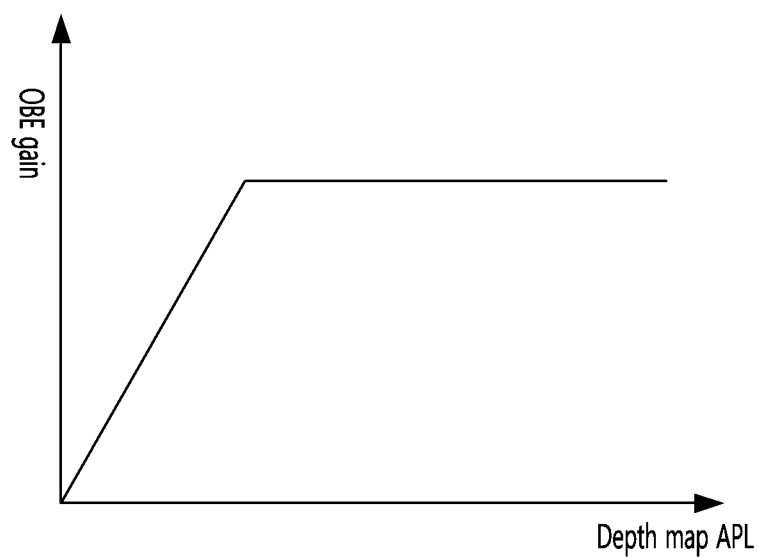
FIG. 17 is a view for explaining an example of gain adjustment of the foreground brightness curve depending on the depth map APL value in the display device according to an embodiment of the present disclosure.

FIG. 17 is a view for explaining an example of the gain adjustment of the foreground brightness curve depending on the depth map APL value in the display device according to an embodiment of the present disclosure.

According to an embodiment, the controller 170 may determine whether the gain of the foreground brightness curve is adjusted according to the value of the depth map APL. FIG. 17 illustrates an example of the gain adjustment, in which the adjusted gain value is flexibly changed according to an image quality evaluation result and an improvement direction.

For example, when the depth map APL is less than the reference value, the controller 170 may select to increase in gain of the foreground brightness curve according to an increase in depth map APL value.

When the depth map APL is greater than the reference value, the controller 170 may select to maintain the gain of the foreground brightness curve in response to the change in depth map APL value.

Figure 18:
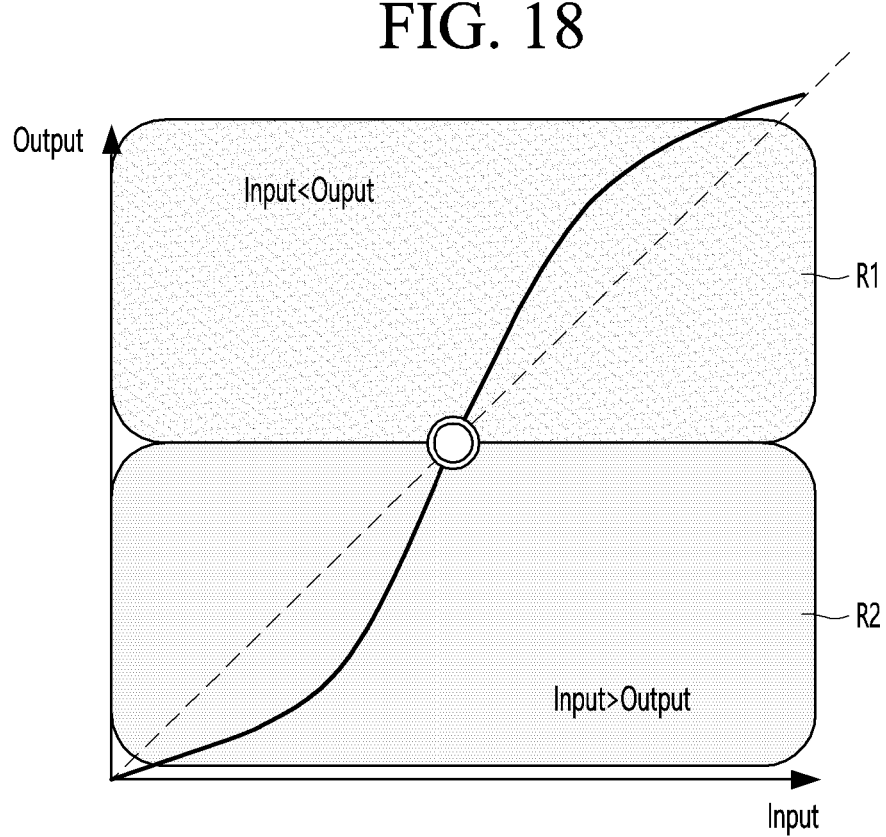
FIG. 18 is a view for explaining a gain adjustment area depending on a comparison value between an output luminance value and an input luminance value in the display device according to an embodiment of the present disclosure.

FIG. 18 is a view for explaining a gain adjustment area depending on a comparison value between an output luminance value and an input luminance value in the display device according to an embodiment of the present disclosure.

According to the display device 100 according to an embodiment, when the controller 170 may adjust the gain of the base dynamic tone mapping curve, a first gain adjustment value in a first region R1, in which the output luminance value is greater than the input luminance value in the base dynamic tone mapping curve, and a second gain adjustment value in a second region R2, in which the output luminance value is less than the input luminance value in the base dynamic tone mapping curve, may be differently set.

According to the display device 100 according to an embodiment, when the controller 170 may adjust the gain of the base dynamic contrast curve, a first gain adjustment value in a first region R1, in which the output luminance value is greater than the input luminance value in the base dynamic contrast curve, and a second gain adjustment value in a second region R2, in which the output luminance value is less than the input luminance value in the base dynamic contrast curve, may be differently set.

Each of the first gain adjustment value in the first region R1 and the second gain adjustment value in the second region R2 may be set to prevent low gradation burying or high gradation saturation from occurring.

Figure 19:
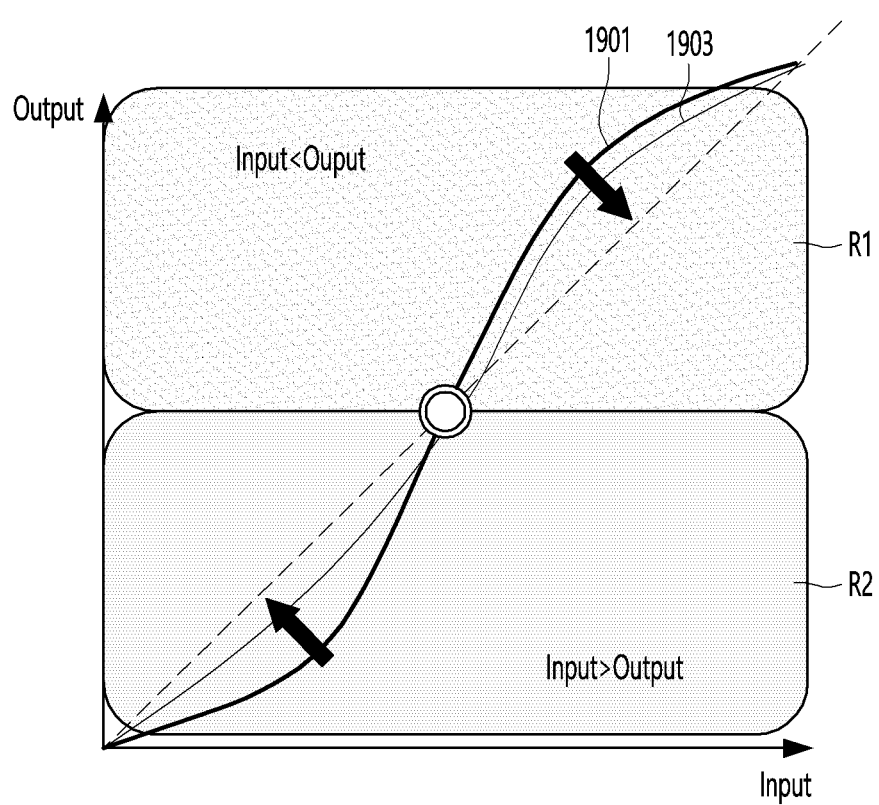
FIG. 19 is a view for explaining an example of the gain adjustment area depending on the comparison value between the output luminance value and the input luminance value in the display device according to an embodiment of the present disclosure.

FIG. 19 is a view for explaining an example of the gain adjustment area depending on the comparison value between the output luminance value and the input luminance value in the display device according to an embodiment of the present disclosure.

According to an embodiment, a first gain adjustment width in the first region R1 may be set to be less than a second gain adjustment width in the second region R2. Alternatively, the first gain adjustment width in the first region R1 may be set to be greater than the second gain adjustment width in the second region R2.

For example, as illustrated in FIG. 19, when the base dynamic tone mapping curve 1901 or the base dynamic contrast curve 1901 is adjusted to the dynamic tone mapping curve 1903 or the dynamic contrast curve 1903 based on the depth map information, the first gain adjustment width in the first region R1 may be set less than the second gain adjustment width in the second region R2.

As described above, according to the display device and the driving method thereof according to the embodiment of the present disclosure, the visibility and the three-dimensional effect of the foreground may be improved.

According to the display device and the driving method thereof according to the embodiment of the present disclosure, the visibility and three-dimensional effect of the image may be improved by dynamically adjusting the dynamic tone mapping curve, the dynamic contrast curve, and the foreground brightness curve.

According to the display device and the driving method thereof according to the embodiment of the present disclosure, the tone mapping may be performed by using the depth map information of the image to improve the visibility and the three-dimensional effect of the image.

According to the display device and the driving method thereof according to the embodiment of the present disclosure, the visibility and the three-dimensional effect of the foreground may be improved.

According to the display device and the driving method thereof according to the embodiment of the present disclosure, the visibility and three-dimensional effect of the image may be improved by dynamically adjusting the dynamic tone mapping curve, the dynamic contrast curve, and the foreground brightness curve.

According to the display device and the driving method thereof according to the embodiment of the present disclosure, the tone mapping may be performed by using the depth map information of the image to improve the visibility and the three-dimensional effect of the image.

The above-disclosed subject matter is to be considered illustrative, and not restrictive, and the appended claims are intended to cover all such modifications, enhancements, and other embodiments, which fall within the true spirit and scope of the present disclosure.

Thus, the disclosed embodiments are to be considered illustrative, and not restrictive, and the technical spirit of the present disclosure is not limited to the foregoing embodiment.

Therefore, the scope of the present disclosure is defined not by the detailed description of the invention but by the appended claims, and all differences within the scope will be construed as being included in the present disclosure.

What is claimed is:

1. A display device comprising:
    a controller configured to perform tone mapping for adjusting luminance of input image data; and
    a display configured to output an image according to the luminance-adjusted image data,
    wherein the controller is configured to:
        generate a base mapping curve based on the input image data;
        analyze depth map information of the input image data;
        generate a mapping curve based on the depth map information and the base mapping curve; and
        perform the tone mapping using the mapping curve.

2. The display device according to claim 1, wherein the base mapping curve comprises at least one of a base dynamic tone mapping curve, a base dynamic contrast curve, or a base foreground brightness curve based on the input image data.

3. The display device according to claim 2, wherein the mapping curve comprises at least one of:
    a dynamic tone mapping curve generated by adjusting a gain from the base dynamic tone mapping curve based on the depth map information;
    a dynamic contrast curve generated by adjusting a gain from the base dynamic contrast curve based on the depth map information; or
    a foreground brightness curve generated by adjusting a gain from the base foreground brightness curve based on the depth map information.

4. The display device according to claim 3, wherein the depth map information comprises a depth map average picture level (APL) of the input image data.

5. The display device according to claim 4, wherein when the depth map APL is greater than a reference value:
    a gain of the base dynamic tone mapping curve is decreased for generating the dynamic tone mapping curve;
    a gain of the base dynamic contrast curve is decreased for generating the dynamic contrast curve; or
    a gain of the base foreground brightness curve is increased for generating the foreground brightness curve.

6. The display device according to claim 4, wherein, when the depth map APL is greater than a reference value, a gain of the base dynamic tone mapping curve is decreased for generating the dynamic tone mapping curve, and
    when the depth map APL is less than the reference value, the gain of the base dynamic tone mapping curve is maintained for generating the dynamic tone mapping curve.

7. The display device according to claim 6, wherein a first gain adjustment value for a first region of the base dynamic tone mapping curve is different than a second gain adjustment value for a second region of the base dynamic tone mapping curve, wherein an output luminance value is greater than an input luminance value in the first region, and wherein an output luminance value is less than an input luminance value in the second region.

8. The display device according to claim 4, wherein, when the depth map APL is greater than a reference value, a gain of the base dynamic contrast curve is decreased for generating the dynamic contrast curve, and when the depth map APL is less than the reference value, the gain of the base dynamic contrast curve is maintained for generating the dynamic contrast curve.

9. The display device according to claim 8, wherein a first gain adjustment value for a first region of the base dynamic contrast curve is different than a second gain adjustment value for a second region of the base dynamic contrast curve, wherein an output luminance value is greater than an input luminance value in the first region, and wherein an output luminance value is less than an input luminance value in the second region.

10. The display device according to claim 4, wherein, when the depth map APL is greater than a reference value, a gain of the base foreground brightness curve is increased for generating the foreground brightness curve, and when the depth map APL is less than the reference value, the gain of the base foreground brightness curve is maintained for generating the foreground brightness curve.

11. The display device according to claim 4, when the depth map APL is less than a reference value, the mapping curve has a same gain as the base mapping curve.

12. The display device according to claim 2, wherein the base mapping curve is generated based on image information comprising histogram information and APL information of the input image data.

13. A method for driving a display device, the method comprising:

generating a base mapping curve based on input image data;

analyzing depth map information of the input image data;

generating a mapping curve based on the depth map information and the base mapping curve; and performing tone mapping on the input image data by using the mapping curve to output a luminance-adjusted image.

14. The method according to claim 13, wherein the base mapping curve comprises at least one of a base dynamic tone mapping curve, a base dynamic contrast curve, or a base foreground brightness curve based on the input image data.

15. The method according to claim 14, wherein the mapping curve comprises at least one of:

a dynamic tone mapping curve generated by adjusting a gain from the base dynamic tone mapping curve based on the depth map information;

a dynamic contrast curve generated by adjusting a gain from the base dynamic contrast curve based on the depth map information; or a foreground brightness curve generated by adjusting a gain from the base foreground brightness curve based on the depth map information.

\* \* \* \* \*